(12) United States Patent
Miyamaru et al.

(10) Patent No.: US 6,950,635 B1
(45) Date of Patent: Sep. 27, 2005

(54) VEHICULAR COMMUNICATION APPARATUS

(75) Inventors: Yukio Miyamaru, Saitama (JP); Tetsuo Yamagata, Saitama (JP); Hajime Tabata, Saitama (JP); Susumu Yoshida, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/471,189

(22) Filed: Dec. 23, 1999

(30) Foreign Application Priority Data

Dec. 25, 1998 (JP) .................................. 10-369058

(51) Int. Cl.$^7$ .............................................. H04B 1/38
(52) U.S. Cl. ...................... 455/90.3; 455/100; 455/99; 455/351
(58) Field of Search ............................. 455/3.05, 3.06, 455/41.1, 41.2, 41.3, 74, 569.1, 569.2, 575.2, 455/575.8, 575.9, 90.1, 90.2, 90.3, 351, 352, 455/99, 100, 345

(56) References Cited

U.S. PATENT DOCUMENTS

| | | | | |
|---|---|---|---|---|
| 3,908,168 A | * | 9/1975 | McMahon | 455/11.1 |
| 4,614,406 A | * | 9/1986 | Motoi | 349/113 |
| 6,311,052 B1 | * | 10/2001 | Lenz | 455/305 |

FOREIGN PATENT DOCUMENTS

| | | | | |
|---|---|---|---|---|
| DE | 42 33 721 A1 | | 4/1994 | |
| DE | 4233721 | * | 4/1994 | ............ H04B 1/38 |
| FR | 2 747 987 A1 | | 10/1997 | |
| GB | 2 103 043 A | | 2/1983 | |
| GB | 2103043 | * | 2/1983 | ............ H04B 9/00 |
| JP | 62-9447 | * | 4/1987 | ............ H04B 1/38 |
| JP | 02-306732 | * | 12/1990 | ............ H04B 1/40 |
| JP | 2-306732 A | | 12/1990 | |
| JP | 2-306732 A | | 12/1990 | |
| JP | 04-362613 | * | 12/1992 | ............ H05K 5/02 |
| JP | 06-251288 | * | 9/1994 | ............ H04B 7/26 |

* cited by examiner

Primary Examiner—Nay Maung
Assistant Examiner—Philip J Sobutka
(74) Attorney, Agent, or Firm—Birch, Stewart, Kolasch & Birch, LLP

(57) ABSTRACT

A vehicular communication apparatus including a helmet worn by a passenger of a vehicle, the helmet having a speaker, a microphone, and a helmet side infrared transmitter/receiver connected to the speaker and the microphone. The vehicle body side or helmet side is provided with a transmitter/receiver for carrying out infrared communication with the helmet side infrared transmitter/receiver. A wireless communication means is connected to the vehicle body side infrared ray transmitter/receiver and arranged with communication operating means separately from the wireless communication means at a location providing simple operation by an operator of the vehicle.

19 Claims, 10 Drawing Sheets

VEHICULAR COMMUNICATION APPARATUS

BACKGROUND OF THE INVENTION

1. Field of the Invention

The present invention relates to a communication apparatus for a vehicle operated by a passenger while wearing a helmet.

2. Background Art

When a passenger wears a helmet, the passenger's ability to hear sound occurring exterior of the helmet is severely hindered. Therefore, there has been proposed an apparatus in which a speaker is installed and a microphone is provided on the helmet, and communication is carried out between the helmet and the vehicular body by an infrared ray, thus, improving the passenger's ability to hear exterior sounds. (Japanese Unexamined Patent Publication No. 2-306732).

According to the patent publication, an acoustic apparatus is provided to the vehicle body side, a sound signal of the acoustic apparatus is converted into an infrared ray signal and transmitted to the helmet side. On the helmet side the infrared ray signal is converted into an electric signal and the speaker incorporated in the helmet is thereby driven to transmit sound to the passenger.

The infrared ray is utilized for the communication between the vehicle body and the helmet; therefore, a connection cord or the like is not necessary to facilitate sound transmission. This alleviates the inconvenience of having to operate the acoustic apparatus with a cord. Moreover, since the apparatus is wireless, connecting or disconnecting a cord when a passenger mounts or dismounts the vehicle is no longer required.

However, the acoustic apparatus of the patent publication has several disadvantages. First, as seen in the publication, the apparatus is applied to a motorcycle, where the acoustic apparatus is arranged between the handlebar and the seat of the motorcycle. Such an arrangement is inconvenient when a passenger is mounting and dismounting the motorcycle. In addition, such a placement of the apparatus increases the difficulty of operating the motorcycle.

Furthermore, since the transmitting/receiving unit of the acoustic apparatus is arranged on motorcycle handlebar (center), when the vehicle is operated with two passengers, the rear passenger is hindered from receiving sound communications transmitted by the transmitting/receiving unit. Therefore, in order to facilitate communications from the front passenger to the rear passenger, the acoustic apparatus of the patent publication employs significant operational members in order to accomplish the task of passenger to passenger communications. This unnecessarily increases manufacturing cost of the acoustic apparatus, and reduces the comfort level of the vehicle passengers. (refer to FIG. 8 in the publication).

SUMMARY OF THE INVENTION

The present invention has been carried out in view of the disadvantages of the above-described patent publication. An object of the present invention, therefore, resides in inexpensively providing a vehicular communication apparatus capable of carrying out communication operation simply, even during operation of the vehicle.

A further object is to provide a vehicle communication apparatus which is free of lead cords, and is simple to operate and handle.

In order to achieve the above-described objects, according to an aspect of the present invention, there is included at least one helmet worn by an operator of a vehicle, the at least one helmet incorporated with a speaker and a microphone mounted thereon, and further including a mounted helmet side infrared transmitter/receiver connected to the speaker and the microphone; a vehicle body provided with a vehicle body side transmitter/receiver for carrying out infrared communication with the helmet side infrared transmitter/receiver; and wireless communication means connected to the vehicle body side infrared transmitter/receiver and arranged with communication operating means separately from the wireless communication means in at a position operably accessible to the operator during operation of the vehicle.

Furthermore, in order to achieve the above-described objects, according to an aspect of the present invention, there is included at least one helmet worn by an operator of a vehicle, the at least one helmet incorporated with a speaker and a microphone mounted thereon, and further including a mounted helmet side infrared transmitter/receiver connected to the speaker and the microphone; wireless communication means connected to the helmet side infrared ray transmitter/receiver, said wireless communication means being carried or attached to the operator; and a vehicle body mounted with a vehicle body side infrared transmitter/receiver for carrying out infrared communication with the helmet side infrared ray transmitter/receiver and arranged with communication operating means separately from the wireless communication means in at a position operably accessible to the operator during operation of the vehicle.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF PREFERRED EMBODIMENTS

Figure 1:
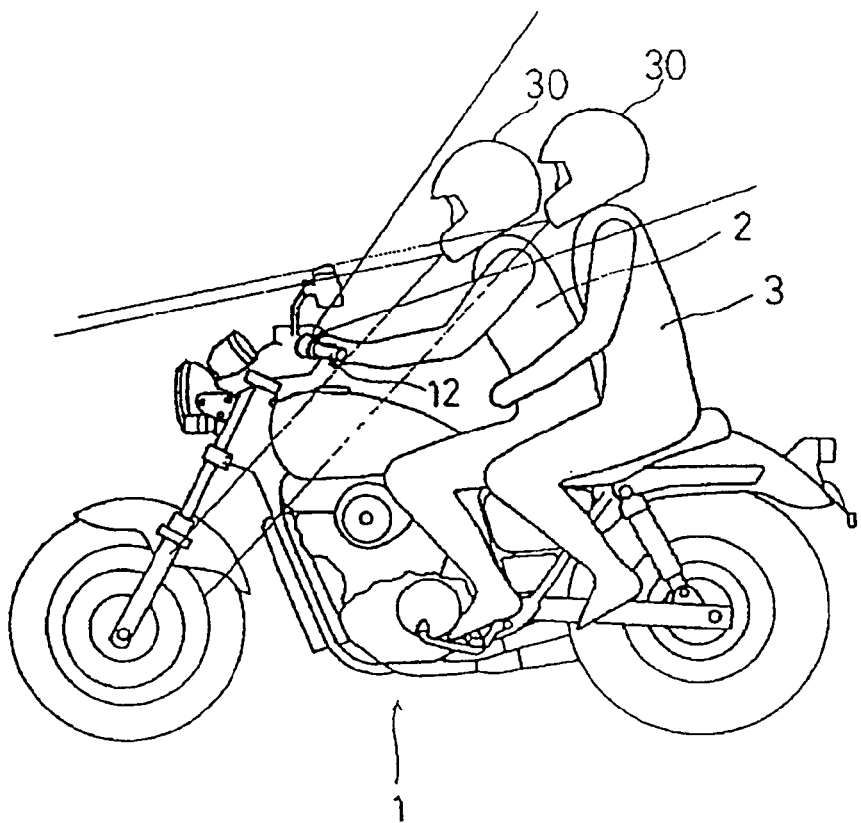
FIG. 1 is a side view of a motorcycle to which a communication apparatus according to an embodiment of the present invention is applied.
Figure 2:
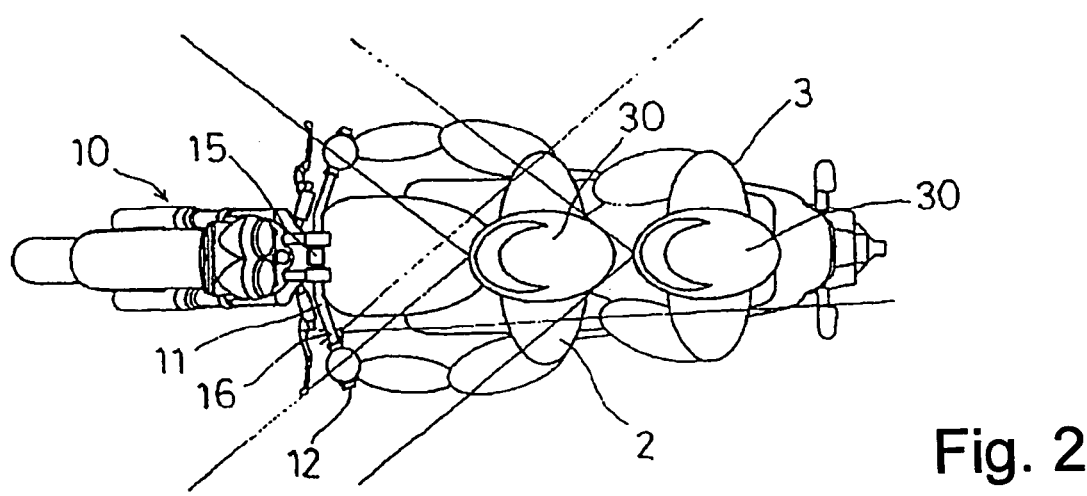
FIG. 2 is a plan view of FIG. 1.

FIG. 1 shows a side view of the motorcycle 1 operated by a driver 2 and having a rear passenger 3 each wearing a helmet 30. FIG. 2 illustrates a plan view of the motorcycle shown in FIG. 1.

The driver 2 and the rear passenger 3 wear helmets 30 of the same kind. A wireless device 15, i.e. a receiver/transmitter device, is provided at a central position of a handle bar 11, and also in reference to FIGS. 2 and 3, a communication module 16 is mounted in the vicinity of a left side grip 12 of the handlebar 11.

Figure 3:
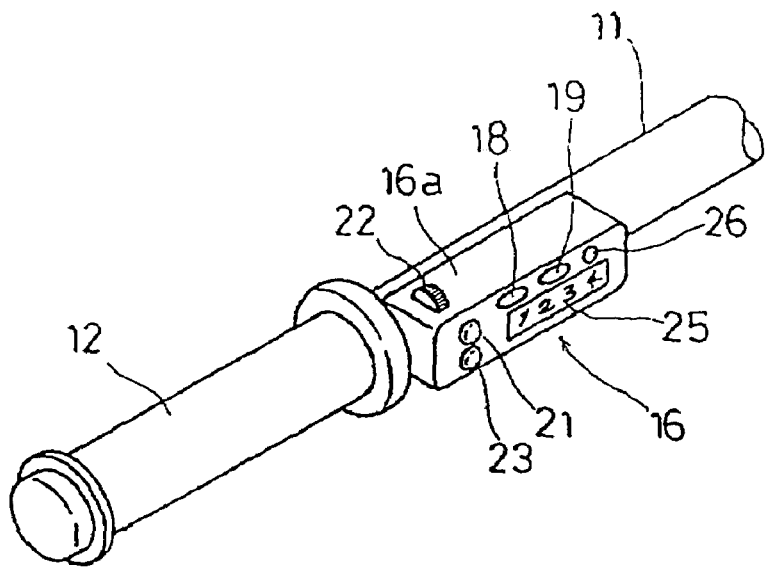
FIG. 3 is a perspective view of a left side grip of a motorcycle handlebar.
Figure 6A:
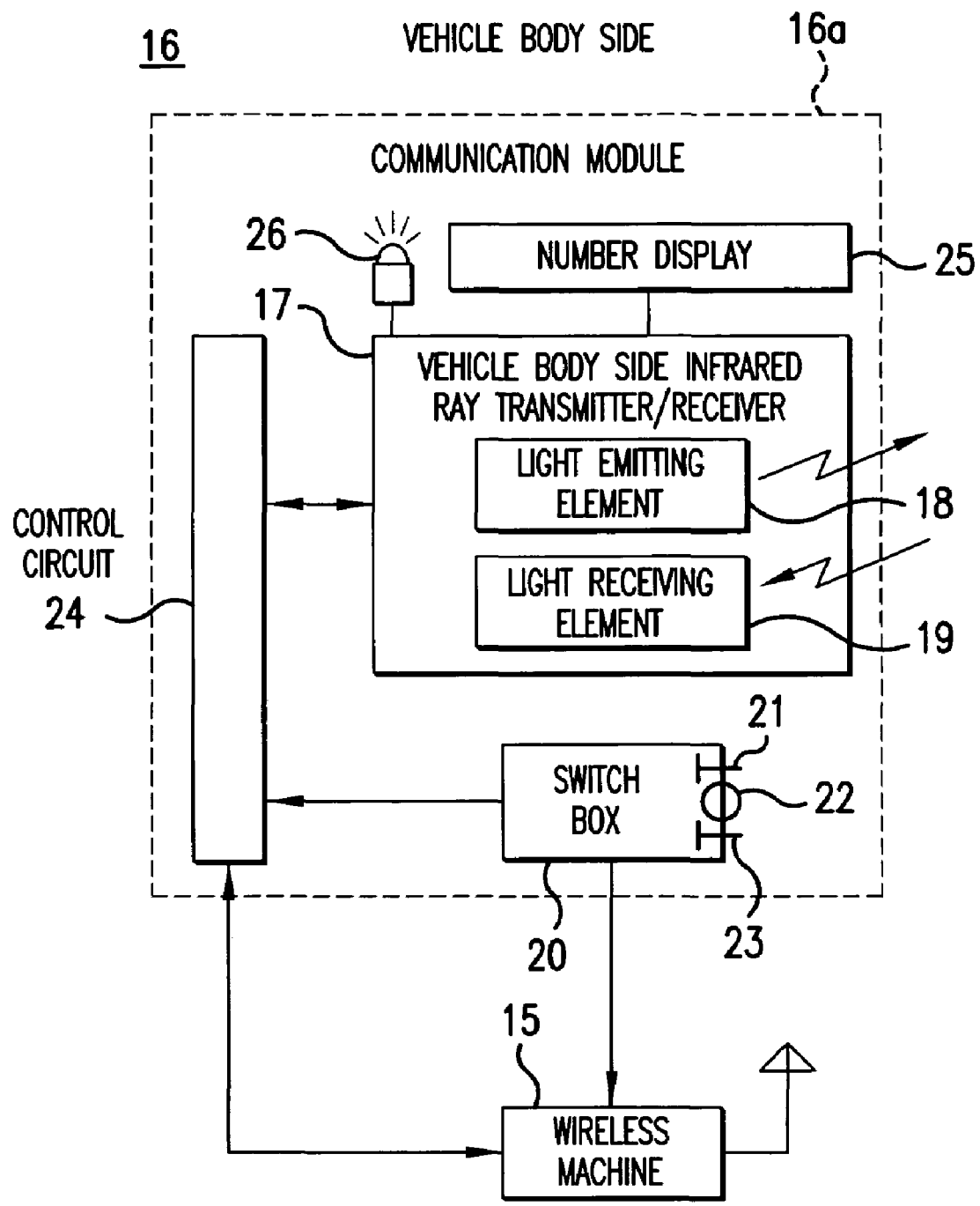
FIG. 6(a) is a block diagram of a communication control system for the vehicle body side in accordance with an embodiment of the present invention.

As seen in FIGS. 3 and 6a, the communication module 16 is integrally assembled with a vehicle body side infrared ray transmitter/receiver 17 and a switch box 20, where the switch box 20 is connected to the wireless device 15 for carrying out communication operations.

The communication module 16 incorporated with the vehicle body side infrared ray transmitter/receiver 17, the switch box 20 and a control circuit 24 (see FIG. 6a), is provided with a liquid crystal number display 25 on the surface of a cabinet 16a, a signal reception indicator 26 as well as a light emitting element 18 and a light receiving element 19 for receiving infrared ray signals. The communication module also includes a mode switching button 21, a frequency selecting dial 22 and a PTT (Push-To-Talk) button 23 of the switch box 20 is on a side proximate to the grip 12.

The control circuit 24, for carrying out communication control on the vehicle body side, is interposed between the vehicle body side infrared ray transmitter/receiver 17 and the wireless device 15 for carrying out signal conversion and an intermediary operation of a voice signal, and for carrying out communication control based on an operating signal of the switch box 20 (see FIG. 6a).

Figure 4:
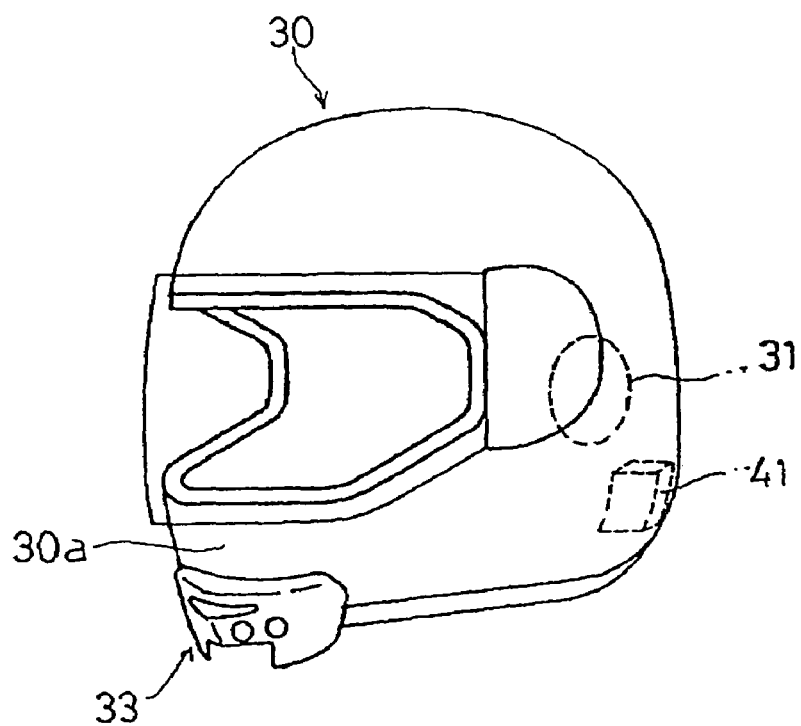
FIG. 4 is a perspective view of a helmet.
Figure 5:
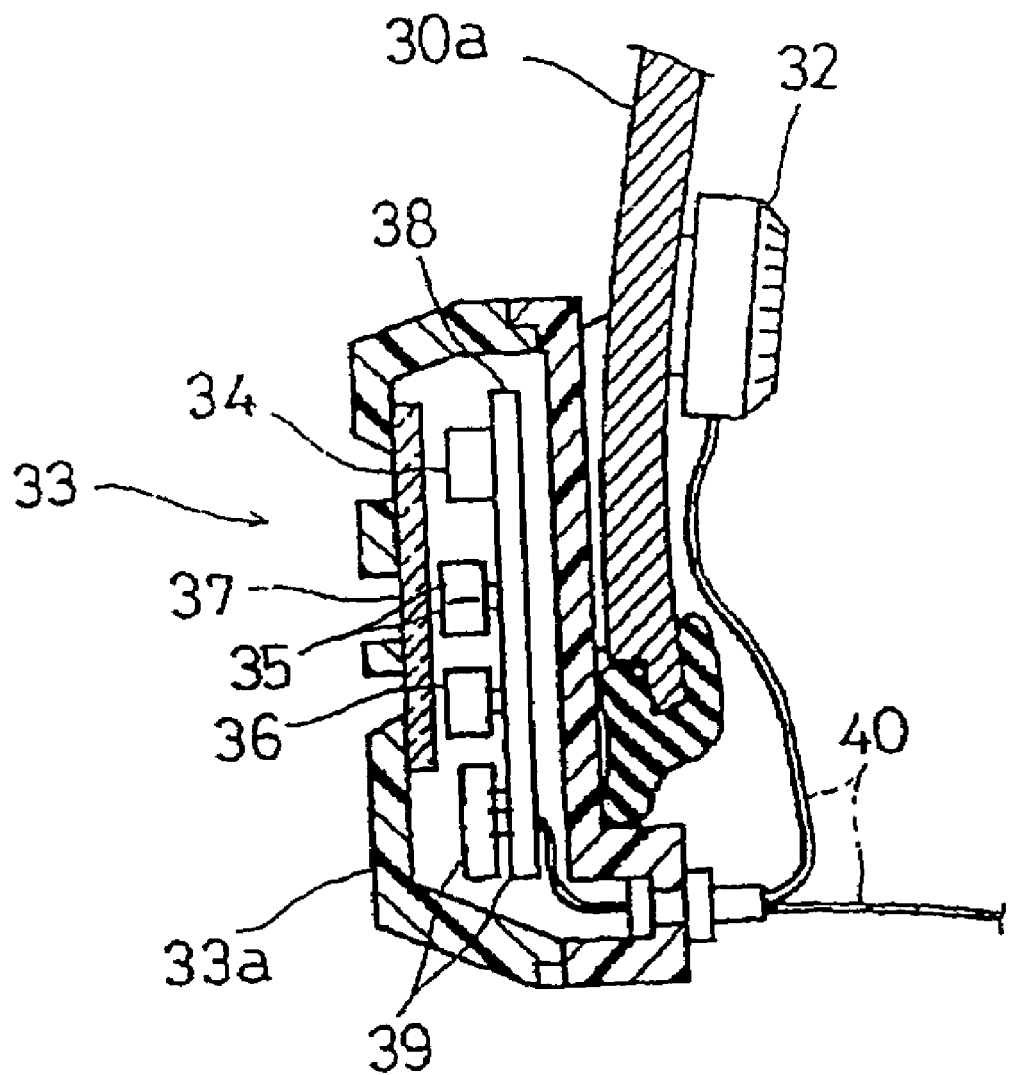
FIG. 5 is a cross-sectional view of a jaw portion of the helmet.

As seen in FIGS. 4 and 5, a full-face type helmet is used as an example of the helmet 30. However, helmet 30 is not limited to a full-face type helmet, any other type helmet may be used in its place. Speakers 31 are respectively mounted to inner faces on both side portions thereof. When speech can be carried out, a beep sound is emitted from the speaker 31 by which a user can be informed of the fact that speech may be carried out. Further, although not illustrated, a volume controlling device of the speaker 31 may be provided to the helmet 30.

A microphone 32 is mounted to an inner face of a jaw portion 30a of the helmet 30, and a helmet side infrared ray transmitter/receiver 33 is mounted to be covered by a cabinet 33a. An opening of a front wall of the cabinet 33a is covered by a transparent lens 37. A light emitting element 34 and a pair of left and right light receiving elements 35 (only one shown) and a transmission indicator 36, which are attached to a board 38 at an inner portion, are erected to be opposed to the lens 37. The left and right light receiving elements 35 are independent from each other and can specify a direction of a sound source by driving the left and right speakers 31 independent from each other. Further, the light emitting element 34 is provided with directivity capability and can specify directional speech via the direction the helmet 30 is directed.

A control circuit 39 for carrying out communication control on the helmet side is arranged on the board 38 and is connected to the speaker 31 and the microphone 32 via cords 40. A battery 41 (see FIG. 4) is attachably and detachably mounted to an inner face of a rear wall of the helmet 30 and supplies electric power to the adjusting circuit 39 and the helmet side infrared ray transmitter/receiver 33.

Figure 6B:
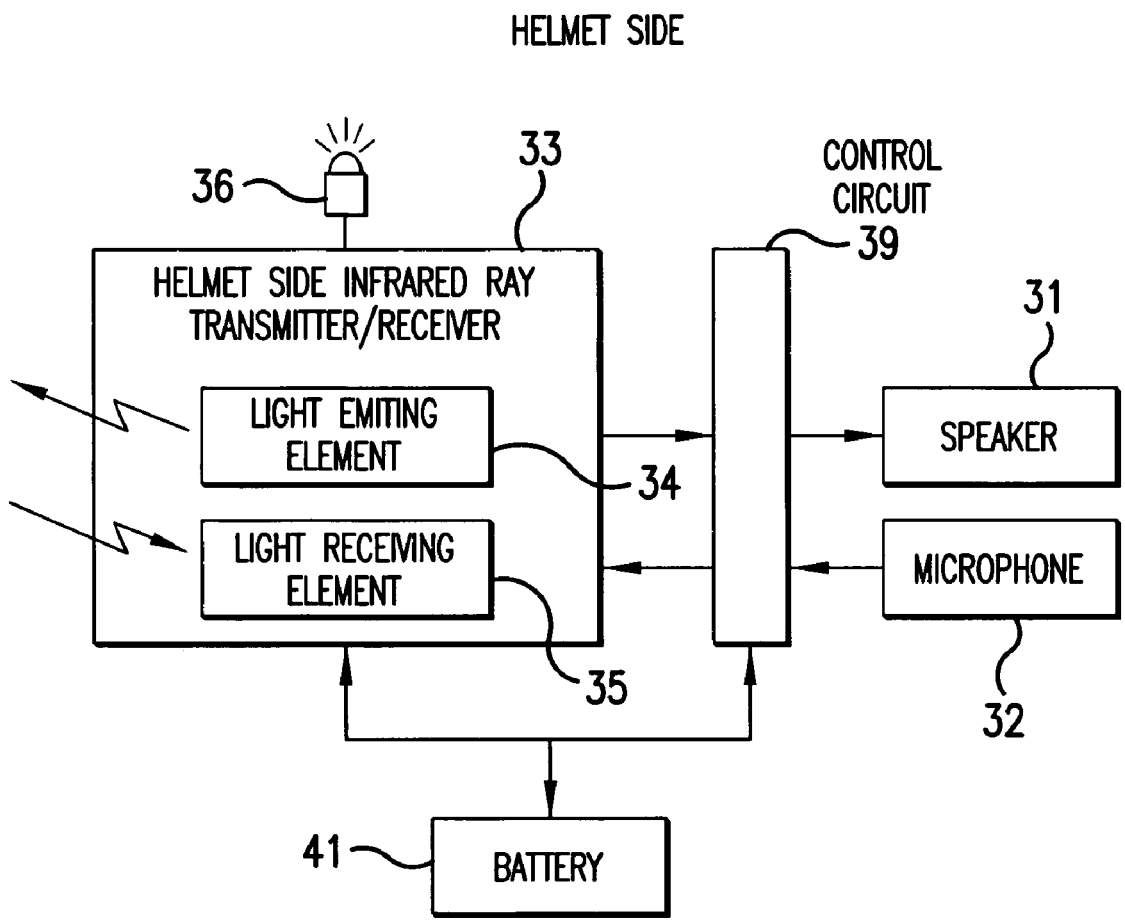
FIG. 6(b) is a block diagram of a communication control system for the helmet side in accordance with an embodiment of the present invention.

FIGS. 6a and 6b shows a block diagram of the above-described communication control system for the vehicle body side and the helmet side, respectively. The vehicle body side is arranged with the wireless device 15 at the center of the handlebar 11, and the communication module 16 in the vicinity of the grip 12. The communication module 16, offset to the left side of the center of the vehicle body, is provided with the vehicle side infrared ray transmitter/receiver 17, which is controlled by the control circuit 24 and arranged with the switch box 15 and the control circuit 24 separately from the wireless device 20 and further provided with the number display 25 and the signal reception indicator 26.

The helmet side is provided with the speakers 31, the microphone 32 as well as the helmet side infrared ray transmitter/receiver 33 and the transmission indicator 36, which are controlled by the control circuit 39. The helmet 30 is worn both by the driver 2 and the rear passenger 3; however, the helmets 30 may be interchanged between the driver 2 and the rear passenger 3.

Now, as shown by FIGS. 1 and 2, assume that the driver 2 and the rear passenger 3 are riding together on the motorcycle 1. When the wireless transmitting/receiving state is set by operating the mode switching button 21 and a frequency is selected by the frequency selecting dial 22, the mode, an abbreviated number of the frequency of the wireless transmission is displayed on the number display 25. As the wireless device 15 receives the wireless transmission, i.e., a radio transmission, the signal reception indicator 26 lights; accordingly, the signal reception can visually be recognized. A received signal is emitted as an infrared ray by the light emitting element 18 of the vehicle body side infrared ray transmitter/receiver 17 via the control circuit 24 to the helmets 30 of the driver 2 and the rear passenger 3 in a skewed upward direction.

The light emitting element 18 of the vehicle body side infrared ray transmitter/receiver 17 is disposed in the vicinity of the left side grip 12, which is offset to the left side of the center of the vehicle body; accordingly, the infrared ray signal emitted from the light emitting element 18 reaches not only the helmet 30 of the driver 2, but also the helmet side infrared ray transmitter/receiver 33 at the jaw portion of the rear passenger's 3 helmet 30 over the shoulder of the driver 2.

The infrared ray signal is received by the light receiving element 35 of the helmet side infrared ray transmitter/receiver 33 and the data is transmitted as voice from the speaker 31 to the driver 2, and the rear passenger 3 via the control circuit 39.

In the case of carrying out signal transmission initiated by the driver 2, when the PTT button 23 is pushed, the wireless device 15 brought into a transmittable state. In this state, speech is made to the microphone 32, the sound signal is emitted as an infrared ray from the light emitting element 34 of the helmet side infrared ray transmitter/receiver 33 to the handle bar 11 in a skewed downward direction via the control circuit 39.

The infrared ray signal is received by the light receiving element 19 of the vehicle body side infrared ray transmitter/receiver 17 and is wirelessly transmitted as a voice data signal from the wireless device 15 via the control circuit 24 to the rear passenger 3. Simultaneously, a voice data signal from the rear passenger 3 may also be emitted to the driver 2.

Furthermore, when an inter-passenger speech state is set by operating the mode switching button 21, speech can be carried out between the driver 2 and the rear passenger 3 via the intermediary of the communication module 16. Further, when the motorcycle 1 is mounted with a stereo radio, tape-player or the like, by connecting the control circuit 24 of the communication module 16 with the radio and setting a radio mode by operating the mode switching button 21, both of the driver 2 and the rear side passenger 3 can listen to the radio by selecting radio stations by using the frequency selecting dial 22.

Figure 7:
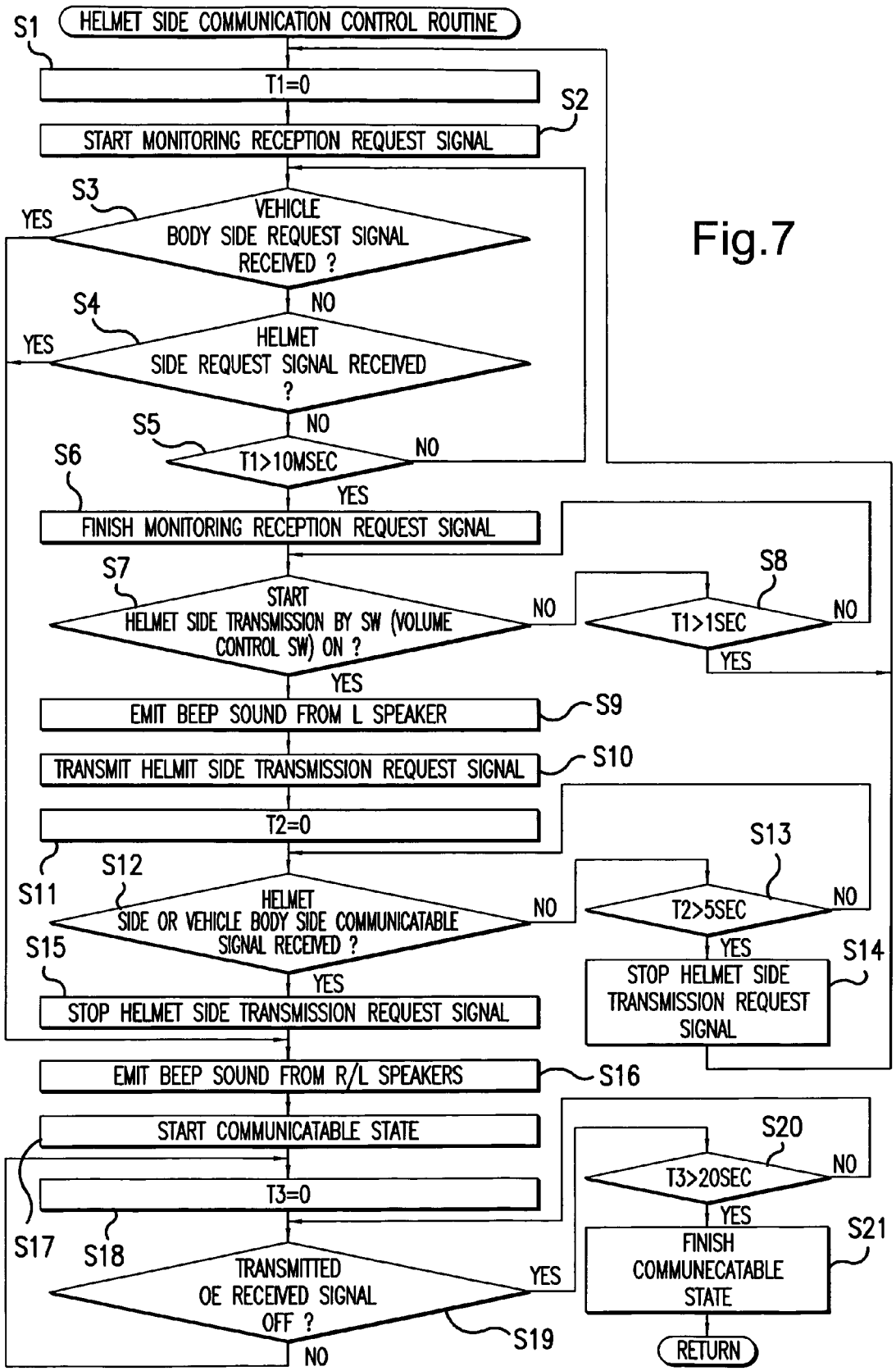
FIG. 7 is a flowchart showing a helmet side communication control procedure.
Figure 8:
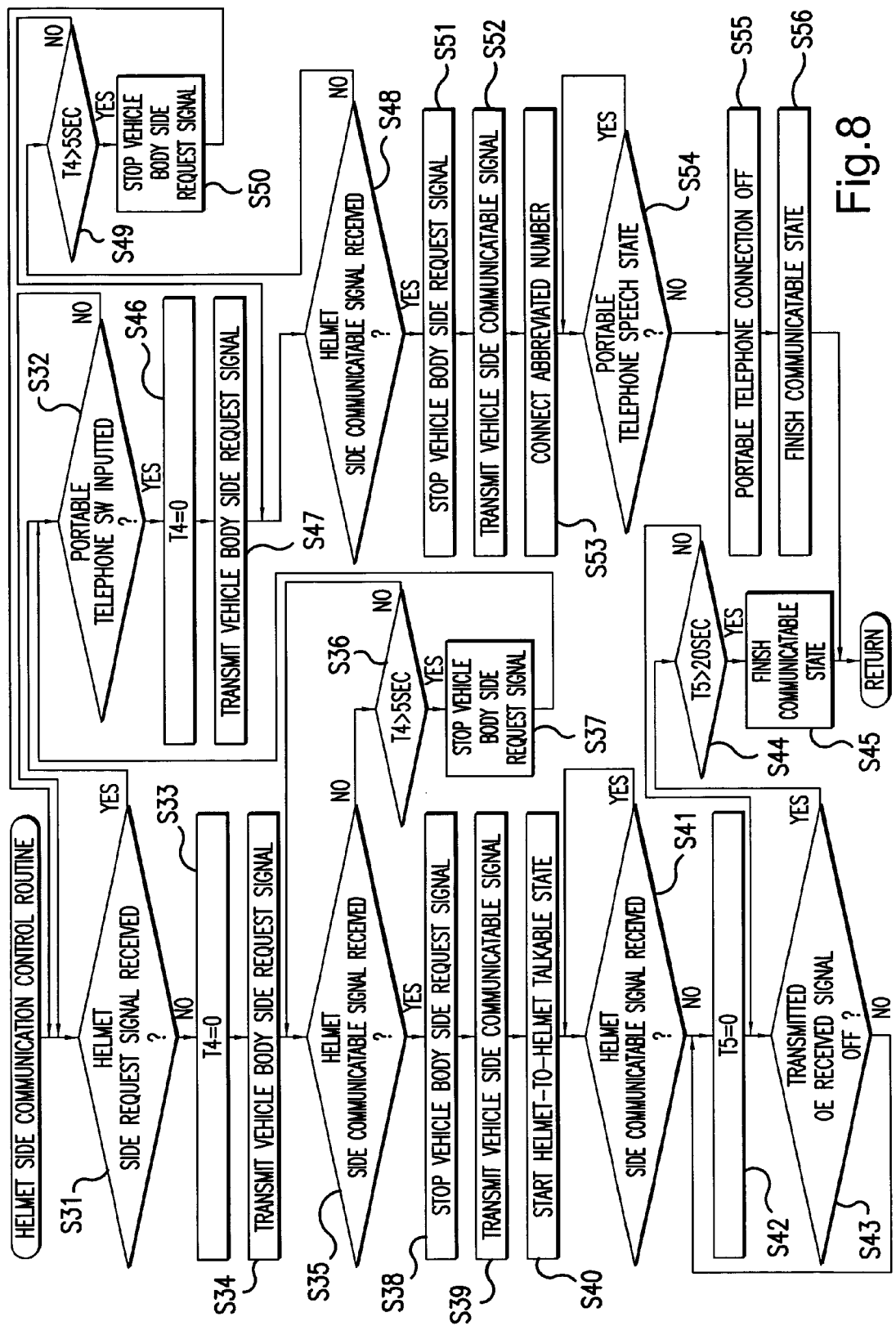
FIG. 8 is a flowchart showing a vehicle body side communication control procedure.

An explanation of the operational characteristics of communication control by an infrared ray signal between the helmet side and the vehicle body side in accordance with the flowcharts of FIGS. 7 and 8 will now be provided. Furthermore, according to the control flowcharts, the embodiment capable of using a wireless device as well as a portable telephone will be discussed.

FIG. 7 is a helmet side communication control routine according to the present invention. In step 1, a timer T1 is started for monitoring a reception request signal (step 2). In decision step 2 it is determined whether a vehicle body side request signal is received. If it is determined that a vehicle body side request is not present, then the operation moves to step 4. In step 4, a determination is made whether a helmet side request signal is received. Steps 3 and 4 are repeated, in the absence of a signal detection, for 10 msec (step 5).

During the time period, when a transmission request from the vehicle body or a helmet occurs, the operation jumps to step 16. When there is no request from either of them, the operation proceeds to step 6, and monitoring of the reception request signal is terminated. Next, in step 7, a determination is made whether transmission is intended from the helmet side by detecting an ON signal from a helmet side transmission start switch (serving also as a volume control switch). Step 7 is executed for 1 second by the timer T1 (step 8). When the switch is not actuated, i.e. turned to the ON state, during the time period of 1 second, the operation returns to step 1.

However, when the switch is in the ON state, the operation proceeds to step 9. In step 9, a beep sound is emitted at the left side speaker to thereby indicate to the helmet user that the ON operation is present. A helmet side transmission request signal is then transmitted (step 10), and a timer T2 is started (step 11). The reception of a transmittable signal from a helmet or the vehicle body side (step 12) is awaited for 5 seconds by the timer T2 (step 13). When there is no reception thereof the helmet side transmission request signal is stopped and the operation returns to step 1.

When there is reception during the time period of 5 seconds, the operation proceeds to step 15, the helmet side transmission request signal is stopped and beep sound is emitted in the left and right speakers of the helmet (step 16) to thereby confirm that a transmission is feasible. Also, as was discussed above, when the reception request signal is received at step 3 or step 4, the operation proceeds to step 16. Next, a communicatable state is started (step 17), a timer T3 is started (step 18) and a determination on whether a transmitted or a received signal was brought into an OFF state (step 19) is executed.

During a time period in which a transmitted or a received signal is ON, that is transmission and reception are being carried out, the operation returns to step 18 and the timer T3 is reset in order to facilitate further transmission and reception. However, when an OFF state of the transmitted or received signal continues for 20 seconds, as is detected by timer T3 (step 20), the communicatable state is finished (step 21) and the operation returns to step 1.

Next, the operational characteristics of the vehicle body communication control routine will be discussed with reference to FIG. 8. First, in step 31, it is determined whether a helmet side request signal, which is a request of signal transmission from the helmet side, is received. If a helmet side request signal is not received, the process proceeds to step 32 where it is determined whether portable telephone information is inputted. When the helmet side request signal is received, the operation proceeds to step 33 and a timer T4 is started. A vehicle body side request signal for carrying out communication via an intermediary of the vehicle body is transmitted to thereby make a request of signal transmission from the vehicle body side to a helmet (step 34). Reception of a communicatable signal from the helmet side (step 35) is awaited for 5 seconds by the timer T4 (step 36). When there is no reception thereof, the operation proceeds to step 37, the vehicle body side request signal is stopped and the operation proceeds to step 32. When reception occurs during the time period of 5 seconds, the operation proceeds to step 38. Next, the vehicle side request signal is stopped and a vehicle side communicatable signal is transmitted (step 39) and a helmet-to-helmet communicatable state is initiated (step 40).

In step 41, when there is a reception state by a wireless device, the flow is brought to a wait state. During the wait state, the helmet and the vehicle side infrared ray transmitter/receivers are connected by an infrared ray signal to thereby carry out communication with the wireless device. When the reception state by the wireless device is released, the operation proceeds to step 42 and a timer T5 is started. The helmet- to-helmet transmission and reception is carried out via an intermediary of the vehicle body side infrared ray transmitter/receiver, during a time period where a transmitted or a received signal is present. The operation returns to step 42 and the timer T5 is to reset, by which transmission and reception can be continued. When an OFF state of the transmitted or received signal is continued a time period of 20 seconds by the timer T5 (step 44), the communicatable state is finished (step 45) and the operation returns to step 1.

However, when there is a switch input of the portable telephone at step 32, the operation proceeds to step 46 and the timer T4 is started. Next, the vehicle body side request signal for carrying out communication via an intermediary of the vehicle body is emitted and a request of signal transmission is executed from the vehicle body side to the helmet (step 47). Reception of the communicatable signal from the helmet side (step 48) is awaited for 5 seconds by the timer T4 (step 49), when there is no reception thereof, the operation proceeds to step 50. At step 50, the vehicle body side request signal is stopped and the operation returns to the initial step 31. When there is reception thereof during the time period of 5 seconds, the operation proceeds to step 51. At step 51, the vehicle body side request signal is stopped, then the vehicle side communicatable signal is transmitted (step 52). In step 53, an abbreviated number is connected (step 53) by which speech can be carried by the portable telephone between the helmet and outside.

When the portable telephone is brought into a speech state (step 54), the flow is brought into a wait state, during the wait period, the helmet and the vehicle body side infrared ray transmitter/receivers are connected by an infrared ray signal to thereby carry out communication by the portable telephone. When speech by the portable telephone is finished, connection of the portable telephone achieves an OFF state (step 55), whereby the communicatable state is finished (step 56) and the operation returns to the initial step 31.

As described above, the vehicle side communication control controls to connect the helmet and the vehicle body side infrared ray transmitter/receivers, and execute communication between the helmets of the driver and the rear side passenger of the motorcycle by which speech can be carried out with outside by the wireless device or the portable telephone.

Figure 9A:
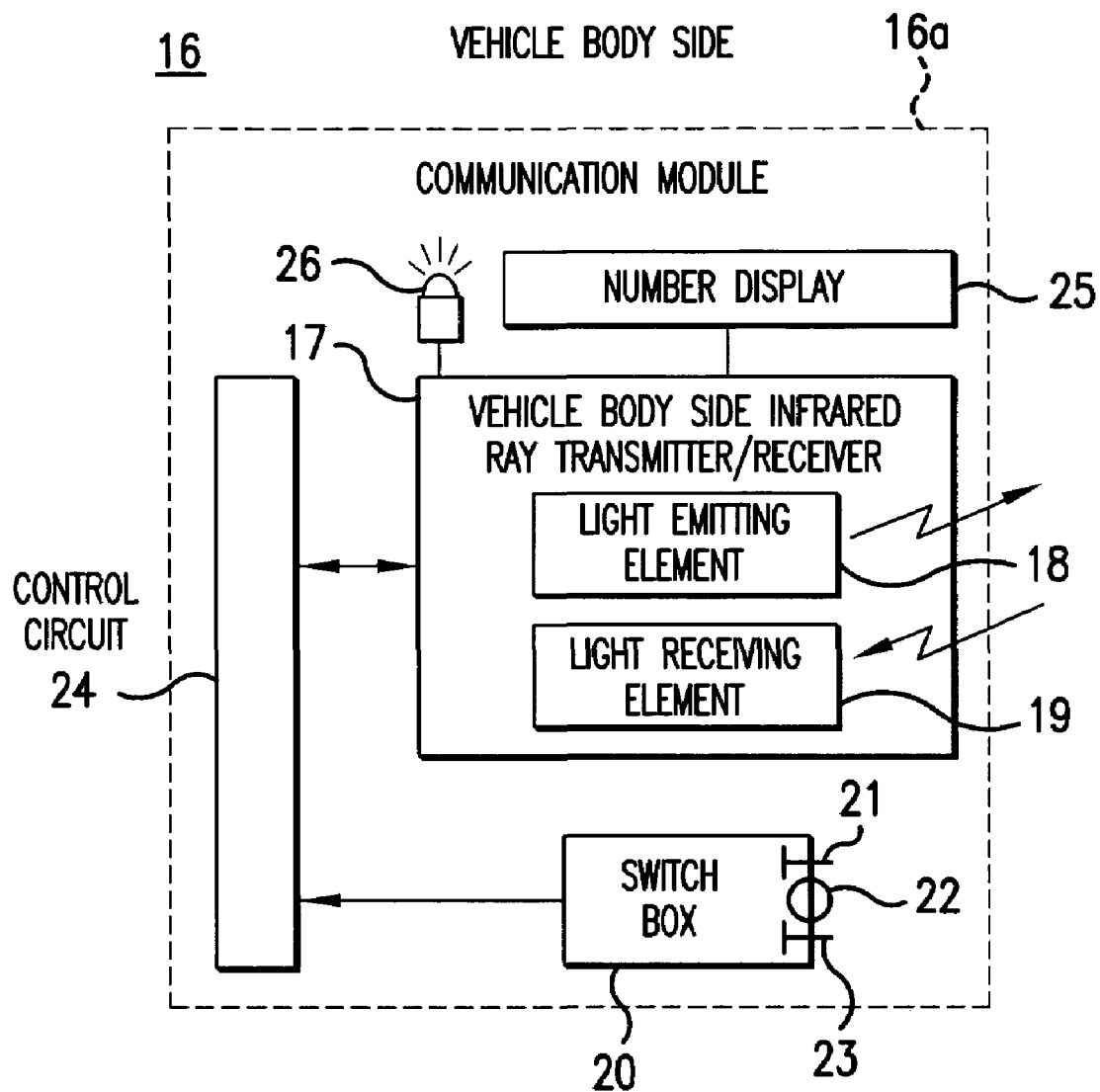
FIG. 9(a) is a block diagram of a communication control system for the vehicle body side in accordance with another embodiment of the present invention.
Figure 9B:
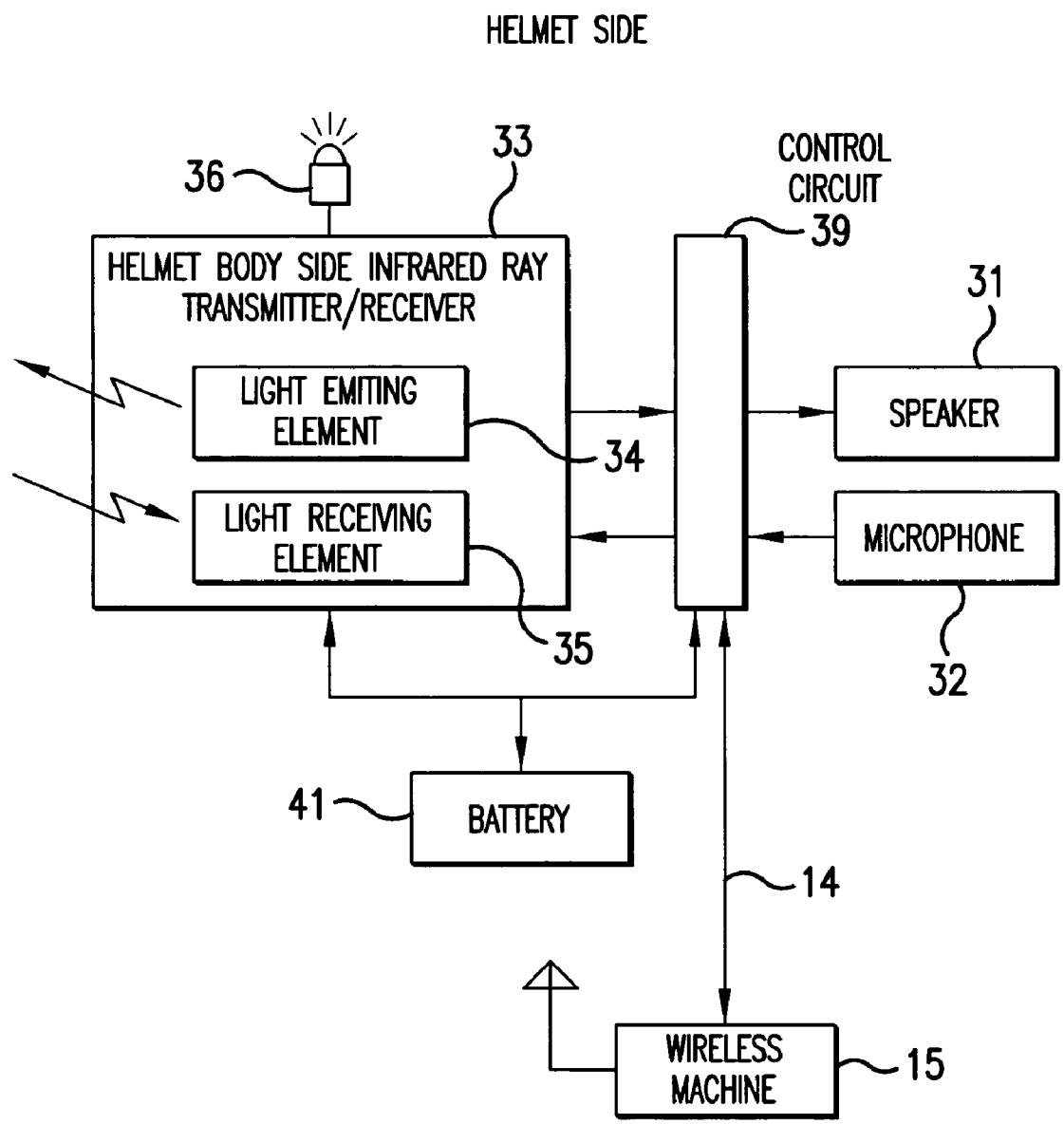
FIG. 9(b) is a block diagram of a communication control system for the helmet side in accordance with another embodiment of the present invention.

Next, FIGS. 9*a* and 9*b* show a block diagram of a communication control system for the vehicle body side and the helmet side according to another embodiment of the present invention, respectively. According to the embodiment, the wireless device 15 provided to the vehicle body side is carried by the driver 2.

For brevity, like reference numerals of the above-described embodiment will not be restated here.

The wireless device 15 is held by the driver 2, or by any other means. A cord 14 extending from the wireless device 15 is connected to the control circuit 39 of the helmet 30.

The switch box 20 which is an operating unit of the wireless device 15 is disposed on the vehicle body side. An operating signal of the switch block 20 is transmitted to the side of the helmet 30 as an infrared ray signal by the light emitting element 18 of the vehicle side infrared ray transmitter/receiver 17 via the control circuit 24. Then the signal is transmitted from the light receiving element 35 of the helmet side infrared ray transmitter/receiver 33 via the control circuit 39 by which the wireless device is operated.

That is, the wireless device 15 is set to a transmitting/receiving state by switching the mode switching button 21 of the switch box 20 to the wireless transmitting/receiving state. The frequency of the wireless device 15 is selected by operating the frequency selecting dial 22 and the wireless device 15 is brought into the transmittable state by switching the PTT button 23 to the ON state.

The helmet side infrared ray transmitter/receiver 33 provided to the helmet 30 is installed at the jaw portion of the helmet 30 and the light receiving element 35 is also arranged at the same position. However, the light receiving element may be arranged on a left or right side wall of the helmet 30 by which, particularly the rear side passenger 3 can further firmly receive the infrared ray from the vehicle body side infrared ray transmitter/receiver 17 without being intercepted by the driver 2.

Furthermore, the helmet side infrared ray transmitter/receiver may be arranged at the forehead portion of the helmet 30 other than the jaw portion of the helmet 30. A portable telephone can be used in place of the wireless device 15 according to the above-described embodiment.

In addition, according to the embodiment shown by FIGS. 6*a* and 6*b*, mentioned above, a robbery preventive control program may be incorporated with the control circuit 24 on the vehicle body side, an acceleration G sensor may be attached to the vehicle body of the motorcycle 1 and a signal thereof may therefore be inputted to the control circuit 24. When the motorcycle 1 is parked and set to a robbery preventive mode, in the case where somebody moves the motorcycle 1, the G sensor detects the movement of the vehicle body. If movement is detected continuously after a predetermined time period, the wireless device 15 or the portable telephone is automatically operated and the detection is informed by communicating with the wireless device or the portable telephone to the residence of the driver, or to a device separately carried by the driver.

In this way, when the motorcycle is determined to be robbed, by transmitting an emergency signal to the vehicle body side, the control circuit 24 inputted with the signal may initiate flashing of the headlight or the sounding of the horn to thereby emit an alarm to the surrounding. Further, a signal informing the position of the motorcycle 1 may be transmitted by a telephone receiver such as PHS, or from a GPS or the like.

Figure 10:
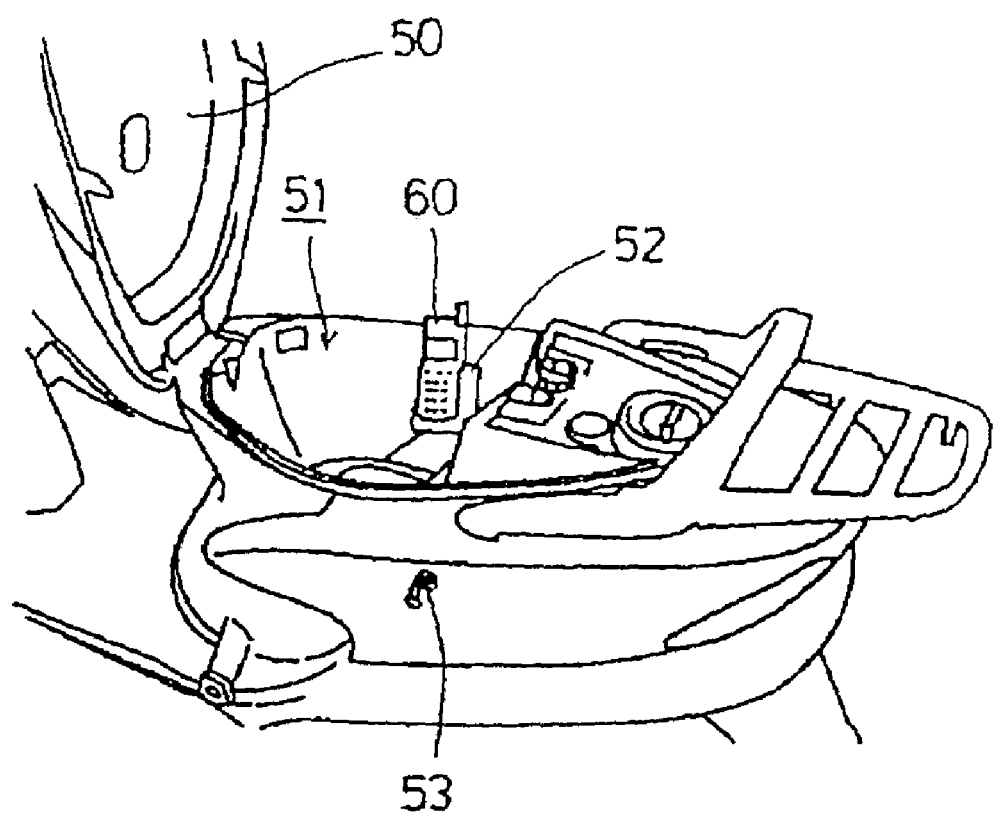
FIG. 10 is a perspective view showing a portable telephone mounted to a vehicle body.

When the portable telephone is mounted to the vehicle body, as illustrated by FIG. 10, a holder 52 may be provided in a trunk 51 opened and closed by a seat 50 at a rear portion of the vehicle body. The holder 52 holds a portable telephone 60.

The portable telephone 60 held by the holder 52 is concealed in the trunk by closing the trunk 51 by the seat 50. By setting a seat lock 53 in a locked state, robbery of the portable telephone 60 can be prevented. Furthermore, by operating the portable telephone 60 automatically in combination with the G sensor as mentioned above, the portable telephone 60 can be used for preventing robbery of the motorcycle.

For example, when persons wearing the helmets 30 face each other, respective infrared ray signals can be transmitted and received between the helmets 30 and speech can be carried out without taking off the helmets 30. In this case, the helmet side infrared ray transmitter/receivers which are used when the driver 2 and the rear side passenger 3 are riding on a vehicle, may be used as they are, and other constitution is not needed as in the conventional case.

Moreover, at least the light emitting element 18 and the light receiving element 19 of the vehicle side infrared ray transmitter/receiver 17 may be taken out from the communication module 16 and mounted to, for example, on either of the left and right rear view mirrors.

The invention being thus described, it will be obvious that the same may be varied and =described in many ways. Such variations are not to be regarded as a departure from the spirit and scope of the invention, and all such modifications as would be obvious to one skilled in the art are intended to be included within the scope of the following claims.

What is claimed is:

1. A vehicular communication apparatus comprising:
   at least one helmet worn by an operator of a vehicle, said at least one helmet incorporated with a speaker and a microphone mounted thereon, and further including a helmet side infrared transmitter/receiver disposed in a cabinet extending forwardly from a jaw portion of the helmet and connected to the speaker and the microphone;
   a vehicle body provided with a vehicle body side transmitter/receiver for carrying out infrared communication with the helmet side infrared transmitter/receiver;
   wireless communication means connected to the vehicle body side infrared transmitter/receiver and arranged with communication operating means separately from the wireless communication means in at a position operably accessible to the operator during operation of the vehicle; and
   the vehicle body side infrared transmitter/receiver being disposed on a rear surface of a handlebar adjacent to the grip so that signals emitting from/to the transmitter/receiver pass directly over a shoulder of the operator of the vehicle to/from a jaw portion of a helmet of a rear passenger of the vehicle.

2. The vehicular communication apparatus according to claim 1, further comprising a frequency selecting dial above the communication operating means.

3. The vehicular communication apparatus according to claim 1, further including a transparent lens on a front side of the cabinet.

4. The vehicular communication apparatus according to claim 1, wherein the vehicle is a handlebar type vehicle, the vehicle body side infrared ray transmitter/receiver is arranged at a position offset to either a left side and a right side of the handlebar; and the helmet side infrared ray transmitter/receiver is arranged at least at a front face of the helmet.

5. The vehicular communication apparatus according to claim 4, wherein the communication operating means arranged at the vicinity of the grip is combined with the vehicular side infrared ray transmitter/receiver to thereby constitute an integrated module.

6. The vehicular communication apparatus according claim 1, further comprising a display unit for indicating a transmitting/receiving state of the wireless communication means, said display unit disposed in a vicinity of the grip of the handlebar.

7. The vehicular communication apparatus according claim 6, further comprising a light receiving element above the display unit.

8. The vehicular communication apparatus according to claim 1, further comprising a light emitting element, a pair of left and right light receiving elements, a transmission indicator are attached to a board at an inner portion of the cabinet.

9. The vehicular communication apparatus according to claim 8, wherein the speaker includes a left and a right speaker, wherein the left and right light receiving elements are independent from each other and can specify a direction of a sound source by driving the left and right speakers independently from each other.

10. A vehicular communication apparatus comprising:

at least one helmet worn by an operator of a vehicle, said at least one helmet incorporated with a speaker and a microphone mounted thereon, and further including a helmet side infrared transmitter/receiver disposed in a cabinet extending forwardly from a jaw portion of the helmet and connected to the speaker and the microphone;

wireless communication means connected to the helmet side infrared ray transmitter/receiver, said wireless communication means being carried or attached to the operator;

a vehicle body mounted with a vehicle body side infrared transmitter/receiver for carrying out infrared communication with the helmet side infrared ray transmitter/receiver and arranged with communication operating means separately from the wireless communication means at a position operably accessible to the operator during operation of the vehicle; and the vehicle body side infrared transmitter/receiver being disposed on a rear surface of a handlebar adjacent to the grip so that signals emitting from/to the transmitter/receiver pass directly over a shoulder of the operator of the vehicle to/from a jaw portion of a helmet of a rear passenger of the vehicle.

11. The vehicular communication apparatus according to claim 10, further comprising a light emitting element, a pair of left and right light receiving elements, a transmission indicator are attached to a board at an inner portion of the cabinet.

12. The vehicular communication apparatus according to claim 10, wherein the communication operating means arranged at the vicinity of the grip is combined with the vehicular side infrared ray transmitter/receiver to thereby constitute an integrated module.

13. The vehicular communication apparatus according to claim 10, further comprising a frequency selecting dial above the communication operating means.

14. The vehicular communication apparatus according to claim 13, wherein the vehicle is a handlebar type vehicle, the vehicle body side infrared ray transmitter/receiver is arranged at a position offset to either a left side and a right side of the handlebar; and the helmet side infrared ray transmitter/receiver is arranged at least at a front face of the helmet.

15. The vehicular communication apparatus according claim 13, further comprising a display unit for indicating a transmitting/receiving state of the wireless communication means, said display unit disposed at a vicinity of the grip of the handle bar.

16. The vehicular communication apparatus according claim 15, further comprising a light receiving element above the display unit.

17. A vehicular communication apparatus, comprising:

a helmet worn by a passenger of a handlebar type small-sized vehicle, said helmet incorporated with a speaker and a microphone and mounted with a helmet side infrared ray transmitter/receiver disposed in a cabinet extending forwardly from a jaw portion of the helmet and connected to the speaker and the microphone;

a vehicle body is arranged with a vehicle body side infrared transmitter/receiver for carrying out infrared ray communication with the helmet side infrared ray transmitter/receiver; and a cabinet having a shape that is rectangular disposed along a section of a rear surface of a handlebar adjacent to a grip, the cabinet housing the vehicle body side transmitter/receiver, a light emitting element, a light receiving element, a visual display, and communication operating means, the light emitting element and the light receiving element being disposed above the visual display on a rear face of the cabinet.

18. The vehicular communication apparatus according to claim 17, further comprising a light emitting element, a pair of left and right light receiving elements, a transmission indicator are attached to a board at an inner portion of the cabinet.

19. The vehicular communication apparatus according to claim 17, wherein the vehicle body side infrared transmitter/receiver being disposed on a rear surface of a handlebar adjacent to the grip so that signals emitting fron/to the transmitter/receiver pass directly over a shoulder of the operator of the vehicle to/from a jaw portion of a helmet of a rear passenger of the vehicle.

* * * * *